Patented Nov. 12, 1940

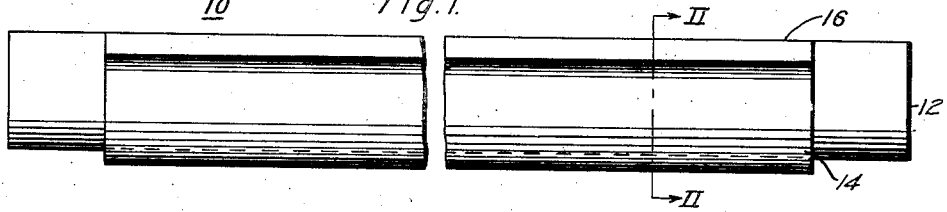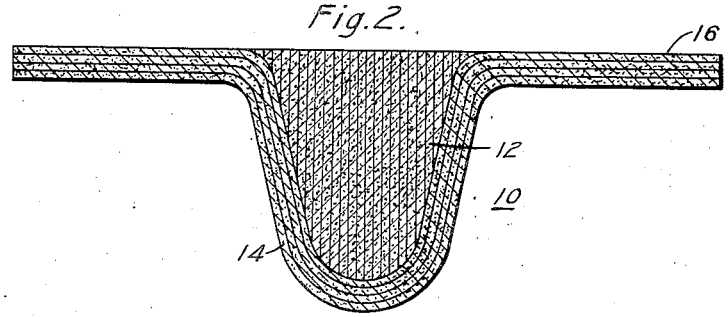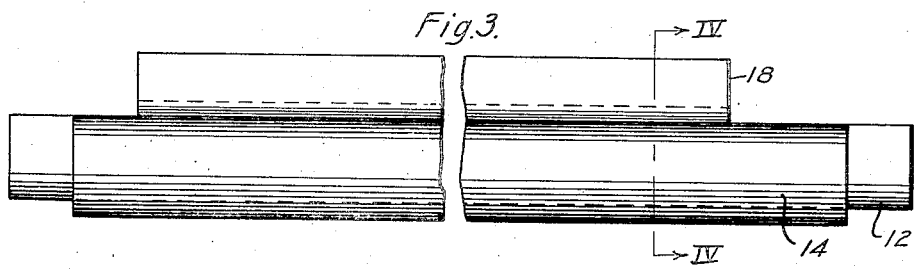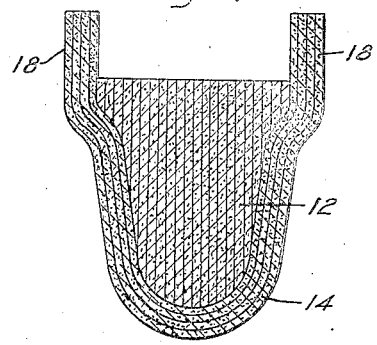

2,221,582

UNITED STATES PATENT OFFICE 2,221,582

INSULATED RUNNER FOR TROLLEY DEVICES

Raymond P. Hanna, Homewood, Pa., assignor to Westinghouse Electric & Manufacturing Company, East Pittsburgh, Pa., a corporation of Pennsylvania Application October 13, 1939, Serial No. 299,334

8 Claims. (Cl. 191—39)

This invention relates generally to devices for use in overhead trolley systems, and particularly to an insulated runner member for use with section insulators, insulating spacer members or the like in overhead trolley systems.

In overhead systems it has often been found necessary to provide insulating members in the overhead system either for the purpose of sectionalizing adjacent portions of the trolley wire or to facilitate providing a smooth junction of trolley wires of opposite polarity, such as at crossings, turnouts and the like.

These insulating members must have a high tensile strength to withstand the mechanical strain of the overhead system, while having good insulating qualities to perform the desired functions thereof. Further, they must be of durable construction to withstand abrasion and mechanical shocks and have a long life to be commercially satisfactory. In practice, the insulating members are usually formed of a main body portion, which is capable of withstanding the pull of the trolley wire, and a renewable runner member associated therewith for providing a wearing portion over which the current collector passes.

Many attempts have been made in the past to provide an insulating runner member which would be capable of withstanding the adverse conditions encountered in service, but such runner members as a whole have had certain undesirable characteristics. For example, runner members of wood are easily burnt or charred, while fibre runner members are unsatisfactory when exposed to moisture. In other types of runner members, the initial expense is prohibitive or they fail in service.

In one of the most recently developed runner members as disclosed in Patent 2,125,092, issued July 26, 1938, to Wahlberg, a runner member is provided having a runner portion formed of asbestos impregnated with a resinous binder. This recently developed insulated runner has better characteristics than those produced prior to the Wahlberg invention, but in service is found to have a limited life of about 100,000 car passes or passes of the current collector over the runner portion. Although this is a substantial improvement over the prior art, it is desired to further improve the runner members to provide an extended life over that of the Wahlberg insulated runner.

An object of this invention is to provide a long-lived insulating runner member of fibrous material impregnated with a resinous binder.

Another object of this invention is to provide an insulating runner member having a runner portion of fibre glass impregnated with a resinous binder and a core member of resilient material for cooperating therewith in providing a long lived member.

A further object of this invention is to provide an insulating runner member having a resilient or shock-proof core member of fibrous material impregnated with a resinous binder and an insulating heat-resisting runner portion of fibre glass impregnated with a resinous binder molded integrally with the core member.

Other objects of this invention will become apparent from the following description when taken in conjunction with the accompanying drawing, in which:

Figure 1 is a side elevational view of a preferred form of insulating runner embodying this invention;

Fig. 2 is an enlarged sectional view of the runner member taken along the line II—II of Fig. 1;

Fig. 3 is a side elevational view of another embodiment of the runner member constructed in accordance with this invention; and Fig. 4 is an enlarged sectional view of the runner member of Fig. 3 taken along the line IV—IV.

Referring to the drawing, and particularly Figs. 1 and 2 thereof, this invention is illustrated by reference to a runner member 10 adapted for use with a main body portion, not shown. The runner member illustrated comprises a plurality of elements, such as the core member 12, runner portion 14 and flanged arc shields 16 molded integrally together, as explained more fully hereinafter.

In order to provide a substantially resilient body capable of absorbing shocks, such as are encountered in service, while retaining the desired insulating characteristics, the core member 12 is formed from a fibrous material, such as hemp fibre paper, or the like, impregnated with a resinous synthetic resin of the condensation type. In making the core member 12, a plurality of sheets of the impregnated paper are stacked and preformed under heat and pressure to provide a partially cured laminated body having a cross-section of approximately the shape of the core member. In order to facilitate manufacturing the runner members 10, the core material is preformed into long rods, and the partially cured rod is cut to the desired lengths of the core member 12.

In order to provide a runner portion 14 which has an exceptionally long life, good strength, and which is electrically insulating and resistant to heat, fibre glass is utilized in conjunction with a resinous binder. The fibre glass can be in the form of a mat of unwoven fibres or, as illustrated and preferred, is in the form of laminated sheets of woven fibre glass. The glass preferred is an inorganic glass and can be of either the staple or continuous filament type, the continuous type being preferred because of its additional strength over that of the comparatively short strands of the staple fibre. In order that the fibre glass can be handled or bent without damage to the filaments thereof, it is preferred that the individual fibres of the fibre glass utilized in this invention have a diameter of not over .0003 inch and preferably not over .00025 inch, such fibres being extremely flexible.

In forming the runner member 10, the mat or laminated sheets of fibre glass impregnated with a resinous binder, such as the phenolic condensation type, is disposed about the preformed and partially cured core member 12, and the assembly is placed in a suitable mold (not shown) where it is subjected to the application of sufficient heat and pressure for a period of time sufficient to cure the resinous binder of the core member and fibre glass runner portion. In practice, it is found that, where the assembly is subjected to a pressure of about twenty tons per square inch at a temperature of 175° C. to 180° C. for a period of time of about thirty-five minutes, the resinous binder of the core member and the runner portion is completely cured and that the runner portion is molded integrally with the insulating resilient core portion thereof.

Where it is desired to provide the flanged arc shields 16 on the insulating runner member 10, larger sheets of fibre glass impregnated with the resinous binder are utilized in forming the runner portion 14, so that the excess portion of the sheets forming the runner portion can be formed into the flanged arc shields 16 simultaneously with the molding of the core member 12 and the runner portion 14 whereby the flanged arc shields can be said to constitute integral extensions of the runner portion. The fibre glass impregnated with the resin is highly beneficial in both the runner portion and the arc flanged shields of the insulating runner member.

In another embodiment of this invention as illustrated in Figs. 3 and 4 of the drawing, the sheets of fibre glass utilized in forming the runner portion 14 are of such a size as to extend upwardly above the core member to provide side flanges 18. These side flanges composed of the same insulating material as is utilized for the runner portion of the insulating runner member 10 aid in providing arc shield protection for the body member (not shown) with which the insulating runner member is to be utilized.

In all cases where the core member and runner portion are molded as described hereinbefore, it is found that a strong integral unit is provided, the resinous binder of both the core member 12 and runner portion 14 bonding the different fibrous materials into a single unit of predetermined design. Although not necessary, where desired, another sheet (not shown) of the fibre glass impregnated with the resinous binder can be disposed across the top of the core member 12 to completely enclose the core member in an outer sheath of fibre glass impregnated with a resin. Where desired, other types of fibrous material impregnated with the resinous binder can be employed across the top of the resilient core member.

In operation, it is found that the insulating runner member of this invention has an extremely long life of approximately twice that of any of the insulating runner members referred to hereinbefore. An examination of the runner member after more than 173,000 car passes reveals that the insulating runner member of this invention is in good condition, even where it has been employed at acceleration points of the overhead trolley system, such insulating runner members being subjected to severe conditions at such points since it is subjected to the rupturing of the accelerating current, which is usually greater than normal currents employed in the systems.

An examination of the runner members constructed in accordance with this invention after they have been in service for more than 173,000 car passes reveals that the runner portion has an extremely smooth surface, it being thought that such surface is the result of the outer fibres of the fibre glass of the runner portion melting under the action of arcs drawn thereacross and glazing the surface. This surface apparently is less subject to abrasion by the collector which passes thereover and is added protection against the deterioration effect of the arc. The melting of the fibres of the fibre glass incorporated in the runner portion improves the insulating characteristics of the runner member, since the glass formed over the runner portion is more resistant to arcing.

Further, since a resilient core member formed of the fibrous material with the resinous binder is employed with the runner portion of fibre glass impregnated with a resin, it is evident that serious damage to the runner portion due to mechanical shock is negatived since any shock is transmitted to the resilient core member and there dissipated. This cooperation between the core member and the runner portion is believed to make it possible that the insulating runner member of this invention has such a long life and is so little affected by abrasion. Further, by reason of the materials employed in the runner member, it is resistant to adverse weather conditions encountered in operation, while at the same time having an extremely high insulating characteristic.

Although this invention has been described with reference to the particular embodiments thereof, it is, of course, not to be limited thereto except insofar as is necessitated by the scope of the appended claims.

I claim as my invention:

1. An insulating runner member for a trolley fixture comprising, in combination, a core member, and a runner portion of fibre glass impregnated with a resinous binder molded integrally therewith.

2. An insulating runner member for a trolley fixture comprising, in combination, a core member, and a runner portion of fibre glass impregnated with a resinous binder molded integrally therewith, the glass fibres having a diameter of not over .00025 inch.

3. An insulating runner member for a trolley fixture comprising, in combination, a core member, and a runner portion of woven fibre glass impregnated with a resinous binder molded integrally therewith.

4. An insulating runner member for a trolley fixture comprising, in combination, a core member, and a runner portion comprising a plurality of laminations of woven fibre glass impregnated with a resinous binder molded integrally therewith.

5. An insulating runner member for a trolley fixture comprising, in combination, a core member of fibrous material impregnated with a resinous binder, and a runner portion of fibre glass impregnated with a resinous binder molded integrally with the core member.

6. An insulating runner member for a trolley fixture comprising, in combination, a core member of fibrous material impregnated with a resinous binder, a runner portion of fibre glass impregnated with a resinous binder molded integrally with the core member, and flanged arc-shield members of fibre glass impregnated with a resinous binder constituting extensions of the runner portion and molded integrally therewith.

7. An insulating runner member for a trolley fixture comprising, in combination, a core member of fibrous material impregnated with a resinous binder, and a runner portion comprising a plurality of laminations of woven fibre glass impregnated with a resinous binder molded integrally with the core member, the glass fibres of the runner member having a diameter of not over .00025 inch.

8. An insulating runner member for a trolley fixture comprising, in combination, a substantially resilient core member, a runner portion, and flanged arc-shield members constituting extensions of the runner portion, the runner portion and flanged arc-shield members comprising laminated sheets of woven fibre glass impregnated with a resinous binder molded integrally with the core member, the glass fibres of the sheets having a diameter of not over .0003 inch.

RAYMOND P. HANNA.